Sept. 11, 1962   E. C. CRITTENDEN, JR., ET AL   3,053,271
SAMPLING PRESSURE REGULATOR
Filed June 22, 1960
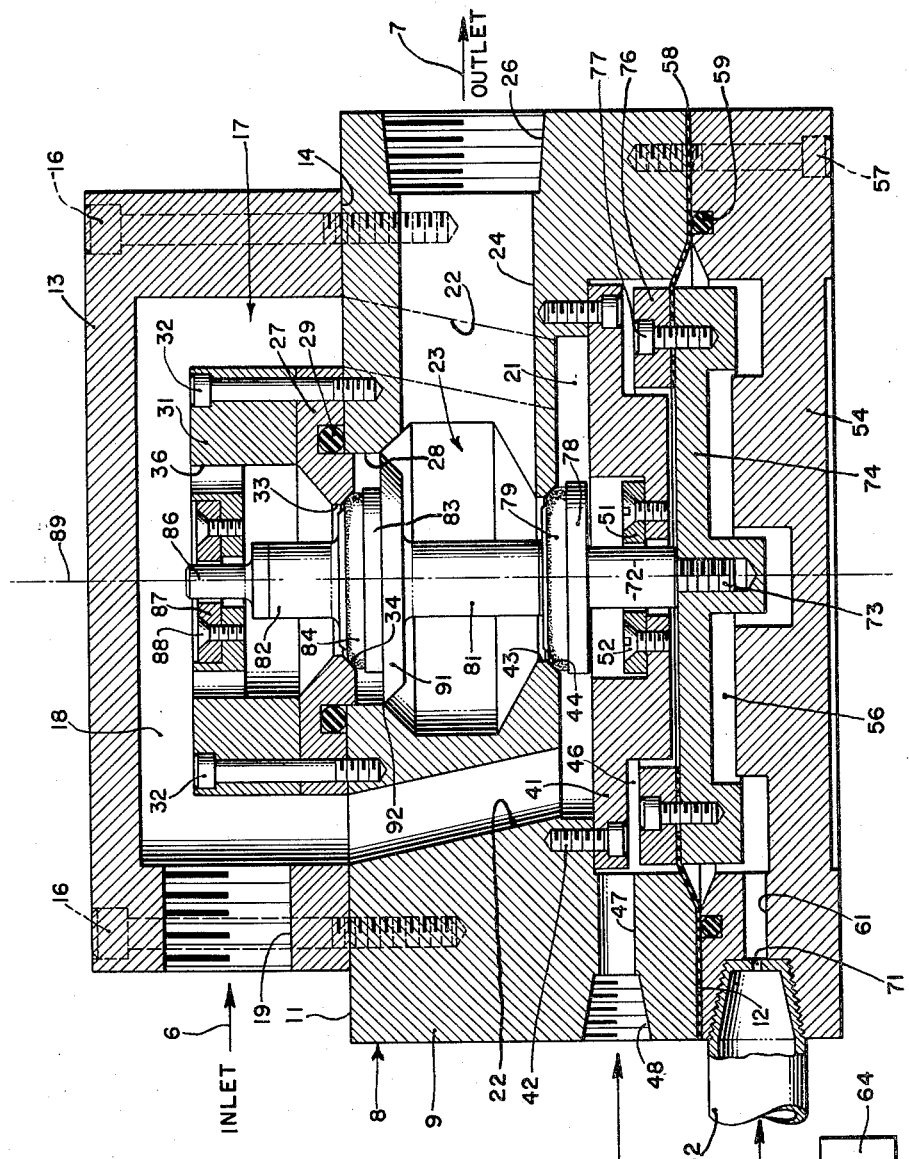
INVENTOR.
EUGENE C. CRITTENDEN, JR.
ERNEST K. GATCOMBE
BY
ATTORNEYS United States Patent Office 3,053,271
Patented Sept. 11, 1962

3,053,271
SAMPLING PRESSURE REGULATOR
Eugene C. Crittenden, Jr., 1176 Castro Road, Monterey, and Ernest K. Gatcombe, R.R. 1, Box 322, Carmel, Calif.
Filed June 22, 1960, Ser. No. 37,998
13 Claims. (Cl. 137—484.2)

The invention is primarily concerned with a device for regulating gas flow in order to establish the pressure in some region associated with such flow at a desired or set value, as compared to a reference, or standard, pressure. Devices of this sort are particularly useful in various environments for regulating flow such as air flow, as in a pressurized aircraft cabin, for example, and are particularly but not exclusively concerned with regulating flow from a region upstream of the pressure regulator to maintain or control the pressure at the upstream point as desired.

An object of the invention is to provide a pressure regulator which is effective not only under nearly static flow conditions, but is also equally effective and accurate over a wide range of flow quantities from substantially none to a large amount.

Another object of the invention is to provide a sampling pressure regulator effective to regulate relatively large amounts of flow by means of relatively small changes in regulating pressure.

Another object of the invention is to provide a sampling pressure regulator in which effects of flow velocity through the regulator are compensated for.

Another object of the invention is to provide a sampling pressure regulator which can be operated under varied ambient conditions without substantially disturbing the desired operation of the regulator.

Another object of the invention is to provide a sampling pressure regulator which is mechanically neat, straightforward and simple, in order that it can be easily manufactured, inspected and serviced.

An additional object of the invention is to provide a sampling pressure regulator which is an improvement over regulators heretofore available.

Other objects of the invention, together with the foregoing, are attained in the form of sampling pressure regulator described in the accompanying description and illustrated in the accompanying drawing, in which:

The FIGURE is a diagram showing the installation of our sampling pressure regulator in a circuit, the FIGURE being for the most part a cross section on a vertical axial plane disclosing the interior arrangement of the device.

While our sampling pressure regulator can be embodied in a number of different ways involving the various important principles thereof, it has successfully been fabricated and operated substantially as shown in the drawing. The drawing is not to scale, but is approximately proportioned to indicate a regulator for use in a main flow line having the same cross-sectional area as a nominal one-inch pipe.

In one environment, the regulator is preferably installed in circuit with an inlet line, represented by an arrow 6, connected to an outlet line, represented by an arrow 7, the regulator thus being installed downstream of the source of flow. The regulator itself comprises a valve body 8, conveniently a metal structure including a number of assembled parts. The body 8 has a central block 9 having a planar upper surface 11 and a planar lower surface 12. Secured to the block 9 is an upper cap 13 having a planar lower surface 14. The cap is secured by removable fastenings 16 with the surfaces 14 and 11 in tight abutment so as to be leakproof. If desired, a gasket, such as an O-ring (not shown) is used between the surfaces 11 and 14.

Within the body 8 there is formed an inlet chamber 17 having an upper portion 18 opening to the inlet line 6 by means of an inlet passage 19, preferably threaded to receive an appropriate connection. The inlet chamber 17 also has a lower portion 21 communicating freely with the upper portion 18 by means of a plurality of ducts 22 formed in the block 9 so that the pressure at any one time throughout the entire inlet chamber 17 is substantially identical.

The block 9 is also provided with an outlet chamber 23 opening to the outlet line 7 through an outlet passage 24 having a terminal 26 for connection to the customary piping. The outlet chamber 23 is in communication with the inlet chamber 17 in two paths.

The upper portion of the outlet chamber 23 is in part defined by a closure plate 27 abutting the planar surface 11 and centrally projecting into a bore 28 the wall of which also partially defines the outlet chamber 23. A sealing ring 29 is disposed between the plate 27 and the block 9. A guide plate 31 is superimposed upon the closure plate 27 and both plates are urged into tight relationship with the member 9 by fastening screws 32. The plate 27 is contoured to provide a central opening 33 which merges with a substantially conical primary valve seat 34 disposed to merge with the chamber 23. The member 31 has holes 36 therein so that there is free communication between the upper portion 18 of the inlet chamber and the outlet chamber 23 past the opening 33 and the valve seat 34.

In a somewhat comparable fashion, the lower portion 21 of the inlet chamber 17 is in part defined by a closure plate 41 held in position by fastenings 42. The block 9 between the lower portion 21 of the inlet chamber 17 and the outlet chamber 23 is defined by an opening 43 and a conical secondary valve seat 44.

Within the body 8 and below the bottom of plate 41 is situated a sampling or test chamber 46 opening through a passage 47 with a threaded terminal 48 into a sampling or test cell 49. The test cell 49 represents a volume or location, the pressure in which or at which is to be precisely regulated by controlling flow from the inlet 6 to the outlet 7. The test cell 49 may be connected to the inlet 6 close to the valve body 8 or at a quite remote point, perhaps being buried within a good deal of mechanism. The pressure existing within the test volume 49, or location, is readily communicated to the test chamber 46 with substantially no loss by means of the passage 47 and any extensions of it.

The test chamber 46 is not entirely closed, but communicates through an orifice plate 51 with the lower portion 21 of the inlet chamber 17. The orifice plate 51 is preferably, for manufacturing reasons, a separate piece connected to the plate 41 by fastenings 52.

Also provided within the body 8 and preferably largely defined by a separate lower plate 54 is a standard chamber 56. For convenience, the lower plate 54 is secured to the block 9 by a plurality of removable fastenings 57. The test chamber 46 and the standard, or reference, chamber 56 are isolated from each other. This is done by an intervening common wall formed by a flexible diaphragm 58 conveniently clamped between the lower plate 54 and the block 9. An additional sealing ring 59 within the lower plate 54 assists in effecting a good seal against the diaphragm 58. The plate 54 and the block 9 are contoured to allow substantial freedom of diaphragm motion but to support the diaphragm against excess pressure in extreme positions.

The standard chamber 56 is generally closed, except for a passage 61 which extends to connections 62 and 63 leading to a standard cell 64. This is a convenient source of a known or reference pressure. The standard or reference cell 64 represents any pressure which is known or set or established. It can be maintained or regulated and adjusted in any desired way, and conveniently has an indicator 66 so that the constancy or value of the set or predetermined standard pressure can be observed and maintained. The pressure within the standard chamber 56 at any time is therefore substantially the same as that maintained or established in the cell 64. Conveniently, the connector 62 has a flow-limiting orifice 71 therein, so that any possible surges between the standard chamber 56 and the reference cell 64 are damped out and suppressed.

Pursuant to the invention, there is provided within the body 8 means for controlling flow therethrough to maintain the desired pressure at the test cell 49. Conveniently secured for movement within and relative to the body, and in unison with the diaphragm 58, is a valve stem 72. At its lower end the valve stem has a threaded extension 73 connected to a lower diaphragm plate 74 disposed adjacent to and immediately below the diaphragm 58. A clamping ring 76 is located above the diaphragm 58 and is secured to the lower plate 74 by fasteners 77. The valve stem 72 and the central portion of the diaphragm 58 always move in unison. The valve stem 72 passes through the orifice plate 51, the fit being a loose sliding fit so that the valve stem 72 is loosely guided at its lower end, and so that the annular opening between the valve stem and the orifice plate 51 serves as a flow-limiting or leakage orifice.

Within the lower portion 21 of the inlet chamber 17, the valve stem 72 has fastened to it a secondary valve 78 of a predetermined diameter. The secondary valve 78 preferably carries a relatively soft sealing ring 79 for movement into and out of abutment with the conical secondary valve seat 44.

The central portion 81 of the valve stem 72 extends through the outlet chamber 23 and merges with an upper portion 82 of the valve stem. Between the portions 81 and 82 there is fastened to the valve stem a primary valve 83 of substantially the same diameter as the secondary valve 78. The valve 83 carries a relatively soft sealing member 84 designed to abut the conical primary seat 34 simultaneously with the abutment of the secondary valve with the secondary seat.

At its upper end, the valve stem 72 carries a pilot 86 slidably disposed within a bearing plate 87 secured to the upper plate 31 by fastenings 88, the plate 87 forming a loose guide for the upper portion of the valve stem. Preferably, the primary valve seat 34, being conical, is made tangent to a sphere, the center of which is preferably on the central axis 89 of the mechanism and is located within the secondary seat 44 so that the valve stem 72 can rock slightly about such center to afford good alignment and seating between the member 84 and the primary valve seat 34.

In addition to the primary and secondary valves, the valve stem 72 between its intermediate portion 81 and its upper portion 82 carries a throttling disc 91 having a sharp edge 92 disposed in close proximity to the substantially cylindrical or characterized throttling wall of the base 28. The interrelationship of the sharp edge 92 of the throttling member 91 with the adjacent surfaces is approximately that of a piston within a cylinder, although the superficial configurations may be varied to give a desired special or characterized shape which is not necessarily precisely cylindrical.

In the operation of this mechanism, the inlet 6 is connected to the source of flowing fluid, whereas the outlet 7 is connected to an outlet or downstream exhaust at a substantially lower pressure. The test cell 49 is connected by the passage 47 to the test chamber 46, while the standard or reference cell 64 is connected through the passage 61 with the chamber 56. The test cell pressure varies from the predetermined pressure established in the cell 64, but is to be held as closely as possible to the pressure within the cell 64.

As fluid, such as gas, flows from the inlet 6 to the outlet 7 through the inlet chamber 18, it travels substantially equally through the open primary valve and the open secondary valve. The exposed areas of the primary and secondary valves being substantially equal, the valve mechanism, or the load upon the stem 72, is substantially balanced, particularly when the flow is at a low rate. When, however, the flow increases in velocity, there then occurs a Bernoulli effect which tends to unbalance the primary and secondary valves. The Bernoulli effect is counteracted and the valves are substantially counterbalanced by the flow past the throttling disc; that is, the flow between the throttling disc and the surrounding surface and the unbalanced pressure of the fluid on the opposite sides of the disc 91 acting as a piston. The characterization or contour of the throttling passage or defining surface is made so that, as nearly as possible, the Bernoulli forces which vary with flow velocity are almost exactly balanced. The resulting load on the valve stem 72 is effectively zero for all positions of the primary and secondary valves and for substantially all flow quantities. Under these circumstances, a very light force is all that is necessary to shift the valve stem 72 to control the primary and secondary valves.

So long as the pressure within the test chamber 46 is the same as that within the standard chamber 56, the diaphragm 58 remains stationary and exerts virtually no force upon the valve stem 72. However, any discrepancy in the relative pressure between the test cell 49 and the standard cell 64 causes a corresponding motion of the diaphragm 58. Since the affected area of the diaphragm is very large, a slight difference in actuating pressure causes a substantial movement of the valve stem 72. Thus, a correcting motion is imparted to the primary and secondary valves to increase or decrease the flow in accordance with the discrepancy between the test cell and standard cell pressures.

The valve mechanism includes a pair of individually unbalanced valves; that is the primary valve by itself and the secondary valve by itself. When considered together, these are in "static" balance, but become unbalanced by increasing flows. This unbalance due to flow is opposed and the mechanism is kept in substantially balanced condition by the provision of the throttling mechanism. This affords a flow control valve readily moved substantial distances by very light actuating forces.

If the valve is kept in the attitude shown in the FIGURE with the axis 89 vertical and the chamber 17 uppermost, then the weight of the valve stem 72 and its attached parts is borne by the diaphragm 58. In practice there is a slight superiority of the standard cell reference pressure over the test cell pressure, depending upon the weight of the supported parts. Under many conditions of operation, some surging may take place between the standard cell and the chamber 56, except for the fact that the restricted orifice 71 provides a damping effect, and also for the reason that the chamber 56 itself is made of a relatively small volume so that the amount of flow through the orifice 71 for a given change is relatively large.

Since the valve stem 72 is only loosely supported within the discs 87 and 51, it can tilt slightly or shift its axis 89 slightly, so that the primary valve can easily find an accurate position on the seat 34, the tilting being substantially about the center of the secondary valve which then also finds a good seat.

In an actual valve substantially as shown herein, utilized to control gas flow to regulate the temperature of a helium cryostat, the valve, sized as stated, reaches a full closure from full open condition for a pressure change at the sampling inlet of about one millimeter of mercury. The valve can achieve an absolute vacuum seal-off with a further pressure change of only two millimeters of mercury. Normal variation in pressure during the usual regulation over a wide variation in helium gas flow through the inlet and outlet is of the order of 1/10 millimeter of mercury.

What is claimed is:

1. A sampling pressure regulator comprising a valve body, means in said body forming an inlet chamber, means in said body forming an inlet passage opening to said inlet chamber, means in said body forming an outlet chamber, means in said body forming an outlet passage opening from said outlet chamber, means in said body forming a primary flow passage between said inlet chamber and said outlet chamber and defining a primary valve seat and a throttling wall, said throttling wall being between said primary valve seat and said outlet chamber, means in said body forming a secondary flow passage between said inlet chamber and said outlet chamber and defining a secondary valve seat, means in said body forming a test chamber, means in said body forming a conduit to said test chamber, means in said body forming a standard chamber, means in said body forming a duct to said standard chamber, a diaphragm mounted in said body and serving as a common wall for said standard chamber and said test chamber, a valve stem secured to said diaphragm and extending through said test chamber and said outlet chamber, a primary valve secured on said valve stem and adapted to abut said primary valve seat, a secondary valve secured on said valve stem and adapted to abut said secondary valve seat, and a throttling disc secured on said valve stem transversely of said primary flow passage and adapted to move in throttling proximity to said throttling wall.

2. A sampling pressure regulator as in claim 1 and in which said primary valve, said secondary valve and said throttling disc are all coaxial.

3. A sampling pressure regulator as in claim 1 and means in said valve body serving as bearing guides, and means on said valve stem slidably disposed in said bearing guides.

4. A sampling pressure regulator as in claim 3 in which one of said bearing guides is located in said inlet chamber.

5. A sampling pressure regulator as in claim 3 in which one of said bearing guides is located between said test chamber and said inlet chamber and provides a leakage path therebetween.

6. A sampling pressure regulator as in claim 1 in which said primary valve seat is approximately tangent to a sphere centered within said secondary valve seat.

7. A sampling pressure regulator as in claim 1 and sealing rings on said primary and secondary valves.

8. A sampling pressure regulator as in claim 1 in which when the axis of said valve stem is vertical and said primary valve is above said secondary valve, the weight of said valve stem and valves is borne by said diaphragm and is resisted by pressure within said standard cell.

9. A sampling pressure regulator as in claim 1 in which said primary valve and said secondary valve are of substantially the same effective diameter.

10. A sampling pressure regulator as in claim 1 in which the axial distance between said primary valve and said secondary valve is substantially the same as the axial distance between said primary valve seat and said secondary valve seat.

11. A sampling pressure regulator as in claim 1 in which said throttling wall and said throttling disc cooperate to correct nonlinear forces due to the Bernoulli effect of flow through said valve body.

12. A sampling pressure regulator as in claim 1 in which the periphery of said throttling disc adjacent said throttling wall is a sharp edge.

13. A sampling pressure regulator as in claim 1 in which the periphery of said throttling disc and the contour of said throttling wall are characterized to compensate for nonlinear forces on said valve stem due to the Bernoulli effect of flow through said valve body.

No references cited.